United States Patent
Anderson, Sr.

[11] Patent Number: 6,128,947
[45] Date of Patent: Oct. 10, 2000

[54] LEAK INDICATING APRON FOR A TOILET

[76] Inventor: Stephen B. Anderson, Sr., 10907 Belvoir Rd., Chester, Va. 23831

[21] Appl. No.: 09/229,070

[22] Filed: Jan. 12, 1999

[51] Int. Cl.⁷ .................................................. G01M 3/08
[52] U.S. Cl. .................................................. 73/46; 73/40
[58] Field of Search ................. 73/40, 46; 4/251.1, 4/252.4, 252.2; 277/606

[56] References Cited

U.S. PATENT DOCUMENTS

| | | | |
|---|---|---|---|
| 2,601,840 | 7/1952 | Smith et al. | 116/206 |
| 2,750,216 | 6/1956 | Thies | 288/20 |
| 2,976,543 | 3/1961 | Turner et al. | 4/252 |
| 3,224,014 | 12/1965 | Pietrzak | 4/252 |
| 3,238,538 | 3/1966 | Turner | 4/252 |
| 3,485,085 | 12/1969 | Hawkins | 73/46 |
| 5,461,904 | 10/1995 | Baker | 73/46 |
| 5,608,922 | 3/1997 | Lewis | 4/251.1 |

*Primary Examiner*—Hezron Williams
*Assistant Examiner*—Jay L. Politzer
*Attorney, Agent, or Firm*—Norman Rainer

[57] ABSTRACT

An apron for indicating a leak from the joinder of a toilet with an underlying closet flange and soil pipe includes a compliant impervious thin sheet having flat upper and lower surfaces. A circular aperture is centered in the sheet. A colorant-emitting disc is attached to the upper surface of the sheet in surrounding annular relationship about the aperture. The dimensions of the disc are chosen so as to interact with the closet flange and intercept any leaks.

7 Claims, 2 Drawing Sheets

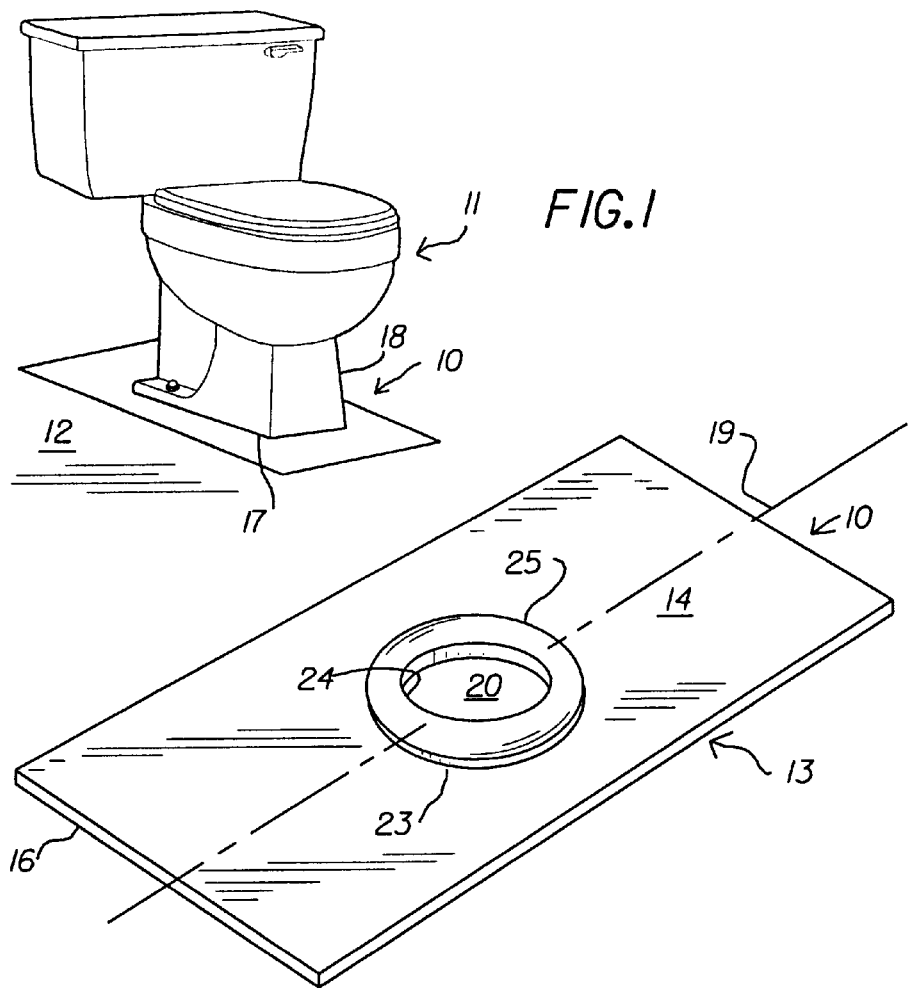
FIG.1
FIG.2
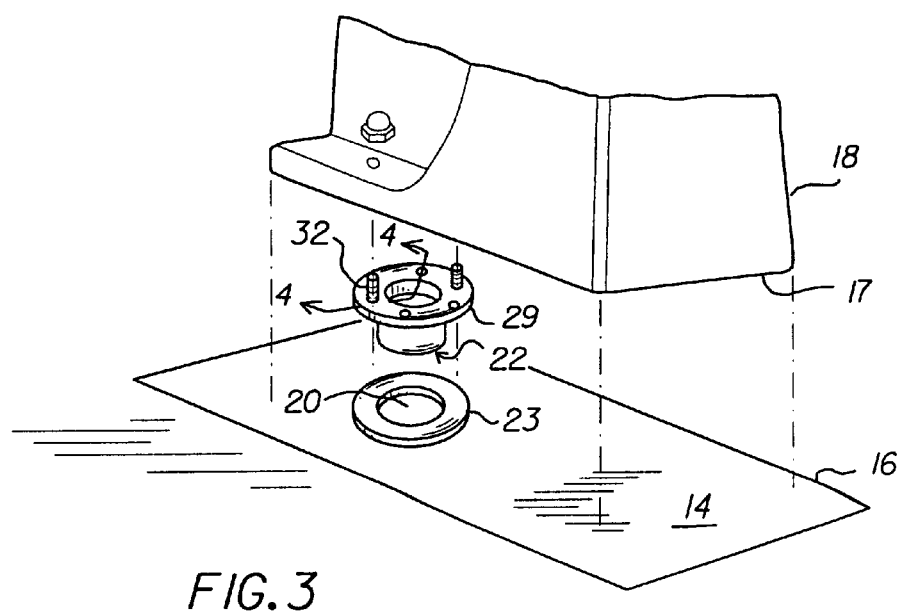
FIG.3

LEAK INDICATING APRON FOR A TOILET

BACKGROUND OF THE INVENTION

1. Field of the Invention

The present invention concerns means for protecting floors under and around toilets, and particularly relates to an apron which indicates the presence of seepage through a primary seal between the toilet and a closet flange.

2. Description of the Prior Art

The successful seal of a toilet to an associated soil pipe has been a long standing problem to which many solutions have been proposed. Most inventions addressing this problem have dealt with improving the primary seal between the toilet and the soil pipe. Proposed seals have been designed to be more effective, longer lasting, or more convenient to install. Few secondary systems have been developed to protect the floor under the toilet in the event the primary seal fails or which provide warning of the failure of the primary seal.

Many devices have been developed which attempt to form a successful seal between a toilet and soil pipe. For example, U.S. Pat. No. 696,183 discloses a rubber gasket for the joint between a toilet and soil pipe through the use of a closet flange also shown in U.S. Pat. No. 3,846,851. The closet flange is typically secured to the floor. The toilet in turn is secured to the closet flange. The soil pipe must be sealed to the flange. U.S. Pat. No. 4,984,308 shows a method of sealing the closet flange to the soil pipe. The sealing of the flange to the soil pipe has not been a chronic problem since the flange and soil pipe are frequently made from similar materials. However, the seal between the dissimilar materials of the toilet bowl and the closet flange has proven to be a difficult problem to overcome. Commonly a wax ring seal is used between the flange and the toilet base to form a seal as is shown in U.S. Pat. No. 3,821,820, issued to M. G. Thompson. As Thompson relates, the traditional wax ring seal may not be totally satisfactory against leakage after a period of time. A number of alternatives to the wax ring seal have been proposed as shown in U.S. Pat. Nos. 4,423,526 and 4,482,161.

A number of configurations of flanges and gaskets have been proposed to facilitate the installation of toilet bowls. U.S. Pat. No. 760,863 shows a flange which is screwed to the soil pipe and has a plurality of vertical rings meant to be cemented to similar grooves in the base of the toilet. U.S. Pat. No. 3,360,805 shows a rubber flange between the toilet and the soil pipe which provides for adjustment of the position of the toilet with respect to the soil pipe. U.S. Pat. No. 5,335,849 shows a flange for rejoining the toilet to the soil pipe following repair of the floor under the toilet. U.S. Pat. No. 1,533,444 shows a floor slab for mounting a bathroom fixture such as a toilet. None of these installation devices provide a secondary seal intended to protect the floor from primary seal leakage.

Devices that extend under the edge of a toilet base include U.S. Pat. No. 4,940,113 which discloses a strip of foam rubber inserted under the edge of the toilet base. U.S. Pat. No. 4,285,075 shows a mat for absorbing liquid spilled near a toilet. The mat surrounds a toilet base but does not extend under the edge of the base. U.S. Pat. No. 5,608,922 discloses a rubber pad disposed beneath a toilet base and extending outwardly therefrom.

Also of interest are pads which are designed to protect the floor from condensation dripping from the toilet, toilet overflow, or from leaks originating from seals within the toilet itself such as the seal between the toilet bowl and the tank as disclosed in U.S. Pat. No. 4,757,560. Such pads are shown in U.S. Pat. No. 918,396 issued to B. F. Tracy, U.S. Pat. No. 2,229,814 issued to T. Mikolajczak, et. al., and U.S. Pat. No. 4,165,545 issued to S. D. Stoltzfus. The Tracy and Mikolajczak pads extend under the toilet; however, neither pad cooperates with the closet flange to catch leaks emanating from the primary seal. In fact these pads appear to rely on a substantially waterproof seal between the bottom edge of the toilet and the pad to keep leaked or spilled liquid on the outside of the toilet from seeping under the toilet. U.S. Pat. No. 5,608,922 discloses a rubber pad disposed beneath a toilet base, and which prevents liquid from becoming trapped under the toilet. As a primary seal for joining a toilet and closet flange which is absolutely effective over a period of time has not been demonstrated, there is a need to protect the floor from leaks flowing through the primary seal. In particular, there is a need for means which will indicate the presence of a leak and which will protect the floor from such leaked water.

U.S. Pat. No. 5,461,904 discloses a flanged joint for use in a pipeline, said joint having leak detecting means in the form of a spout radially emergent from the flange.

Accordingly it is a principal object of the present invention to provide apparatus means for protecting the floor under a toilet from leaks, especially leaks through the primary seal between the toilet base and the closet flange.

It is another object of this invention to contain any leaks to an area which extends beyond the footprint of the toilet so that the leak is exposed to detection.

It is a further object of the present invention to provide an apron equipped with means for visually indicating seepage from said primary seal.

It is a still further object of this invention to provide an apron of the aforesaid nature of simple construction amenable to low cost manufacture and permitting easy installation.

SUMMARY OF THE INVENTION

The apron according to the present invention supplements the primary seal between a toilet and an associated soil pipe. The primary seal must provide a gas and water tight seal between the dissimilar materials of the closet flange and the toilet base. This primary seal is most commonly a deformable ring composed of a wax like substance which is compressed between the flange and the toilet base. Primary seals between a toilet and a soil pipe are known to be susceptible to leaks over time, especially when subjected to changes in temperature or stress at the joint. These leaks are frequently very slow leaks which are easily absorbed by the floor. Thus, the first sign of the leak may then be the collapse of a rotten floor or a waterlogged ceiling below the toilet. The present invention provides an apron which protects the floor from leaks through the primary seal between the closet flange to the toilet base. The apron contains any leaked liquid in an area which extends beyond the outside of the footprint of the toilet. The apron thus provides for detection of the leak in a timely fashion, allowing the primary seal to be replaced prior to damage occurring to the building structure under the toilet.

The apron of the present invention is comprised of:

a) a compliant impervious thin sheet bounded by upper and lower flat surfaces and a substantially rectangular outer perimeter configured to extend beyond the outer edge of said toilet base, and having a circular aperture configured to snugly embrace said soil pipe or closet flange, and b) a colorant-emitting disc attached to said upper surface in surrounding annular relationship about said aperture, the colorant in said ring being released by contact with water.

Said apron, when properly emplaced upon a floor beneath the toilet and embracing said soil pipe or closet flange, collects liquids leaked from any portion of the toilet, but only seepage from the primary seal will cause visually distinctive colorant to leach out, of said disc. The colored water thereby produced runs beneath the edge of the toilet base toward the perimeter of said sheet, thereby signalling the existence of a faulty primary seal.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is an environmental perspective view of an apron according to the present invention shown in place under a toilet.

FIG. 2 is a perspective view of the apron of FIG. 1.

FIG. 3 is an exploded environmental perspective view showing the flange for connecting the toilet to a soil pipe with an intervening apron as in FIG. 1.

DESCRIPTION OF THE PREFERRED EMBODIMENT

Figure 4:
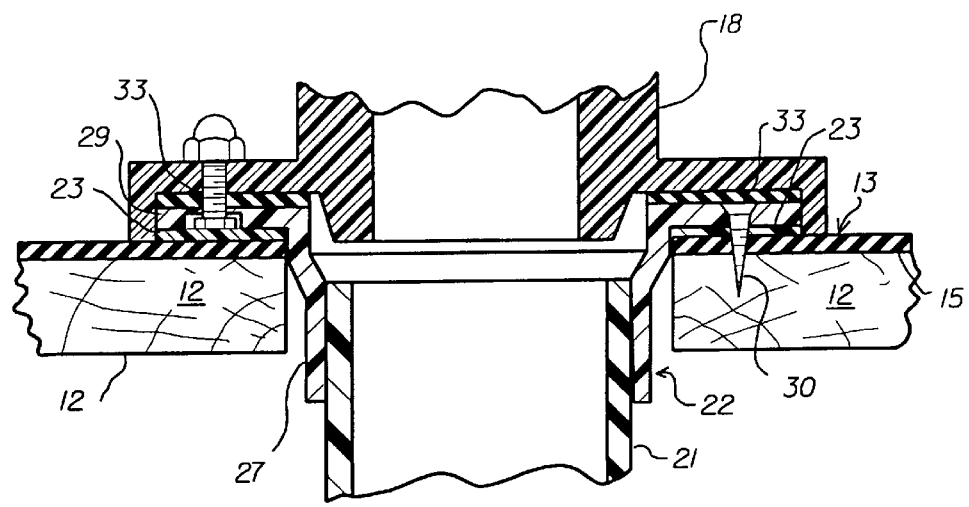
FIG. 4 is an enlarged fragmentary sectional view taken along line 4—4 of FIG. 3.

Referring now to FIGS. 1–5, an embodiment of the apron 10 of the present invention is shown disposed between a typical toilet 11 and floor 12.

Apron 10 is comprised of compliant impervious sheet 13 bounded by upper and lower flat surfaces 14 and 15, respectively, and further defined by substantially rectangular perimeter 16 configured to extend beyond the outer edge 17 of the toilet base 18. Perimeter 16 may be further characterized as having a long center axis 19 which bisects said perimeter. A circular aperture 20 is centered upon axis 19. The diameter of aperture 20 is such as to enable said aperture to snugly embrace the soil pipe 21 or closet flange 22 disposed beneath toilet 11. Said diameter will accordingly range between 3 and 5 inches. An annular colorant-emitting disc 23, surrounds aperture 20 upon upper surface 14.

Sheet 13 may suitably be a film fabricated of polyethylene, plasticized polyvinyl chloride, rubber or other durable and water-impervious polymer material, and may be clear or opaque. The opaque sheets may be colored to match the color of the toilet, floor or bathroom walls. The thickness of sheet 13 is such as to provide durability, yet not so thick as to constitute a tripping hazard. Accordingly, sheet thicknesses may range from about 10 to 80 mils. Sheet 13 may be a film or a laminated or fiber-reinforced sheet. The exact contour of perimeter 16 may be such as to match or compliment the contour of toilet base 18. When perimeter 16 is rectangular, it may typically measure about 18 inches by about 24 inches.

It is important to note that, even though sheet 13 extends beneath toilet 11, it permits water seepage from the primary seal to run under outer edge 17 of the toilet while retained upon upper surface 14 of the sheet. Said sheet also facilitates maintenance of the floor region surrounding the toilet. An upturned lip may be disposed about perimeter 16 to retain water upon said upper surface.

Colorant-emitting disc 23 may be a porous felt-like or sponge-like substrate of uniform thickness containing a water-soluble or water-dispersible colorant such as a dye or pigment. Suitable substrates include conventional felts made by the interentanglement or "felting" of fibers, or may be non-woven bonded synthetic fiber structures, such as "Hollytex" sold by Eaton-Dickeman, a subsidiary of Filtration Science, Inc. Similar substrates are also supplied by the DuPont Company under the trademark Reemay Style 2024. Other types of substrates useful in the practice of this invention include thin porous sheets made by the controlled thermal sintering of particulate thermoplastic material, and sheets of open-celled foam material made either by use of blowing agents, or by way of dissolution of uniform granular material initially incorporated within a sheet-casting composition. The dye or pigment may be incorporated into the substrate either during production of the sheet or as an after-treatment. Disc 23 is preferably secured to the upper surface of sheet 13 by a water-resistant adhesive which does not occlude the pores of the substrate. Disc 23 may have a thickness between about 0.01 and 0.2 inch, and has a width, measured orthogonally between inside and outside circular edges 24 and 25, respectively, of between 0.5 and 2.0 inches. Inside edge 24 may be congruent with aperture 20 or outwardly displaced therefrom.

The apron of this invention is deployed flat upon floor 12 beneath toilet 11 with aperture 20 sealingly contacting closet flange 22, as shown in FIG. 2. Closet flange 22 includes a substantially cylindrical portion 27 which passes through aperture 20 in sheet 13. Said cylindrical portion 27 is sealed to soil pipe 21. Generally perpendicular to cylindrical portion 27 extends circular portion 29 which is secured to floor 12 by screws 30. Said screws 30 pass through sheet 13 and are sealed with a sealant such as a silicone sealant. Toilet base 31 is bolted to closet flange 26 with bolts 32. A wax ring 33 is typically employed as the primary sealing unit between base 18 and closet flange 22.

As shown in FIG. 4, aperture 20 is maintained in a tight fitting sealed position around cylindrical portion 27 of closet flange 22. Sheet 13 thus extends from outside base 18 and under circular portion 29 of closet flange 22. With this arrangement, any liquid leaked through wax ring 33 will be retained on sheet 13 and will be visible without contacting floor 12. Leaked liquid containing colorant indicates that wax ring 33 should be inspected.

Installation of apron 10 is accomplished by the following method. Apron 10 is placed on the floor 12 in the orientation in which it is desired to install toilet 11. Aperture 20 is positioned over soil pipe 21 which is sealed to closet flange 22 attached to floor 12. The wax ring 33 is installed on closet flange 22 and toilet 11 is bolted to flat circular portion 29. In this manner all leaks seeping through wax ring seal 33 contact disc 23, and are retained upon sheet 13.

Figure 5:
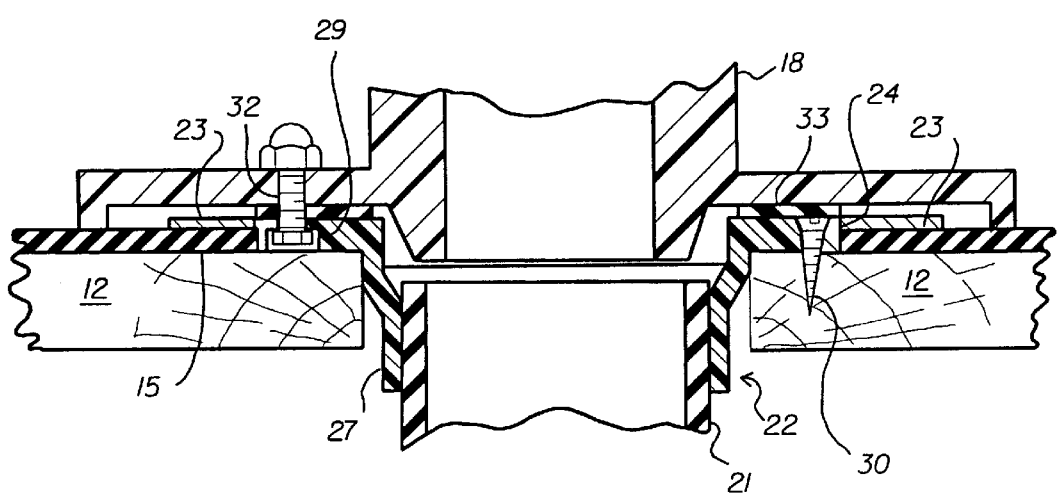
FIG. 5 is a sectional view similar to FIG. 4, but showing an alternative embodiment of the apron according to the present invention.

An alternate arrangement is shown in FIG. 5. The installation of apron 10 in FIG. 5 does not require the removal of a closet flange if previously installed. In this arrangement aperture 20 is maintained in a tight fitting position around the perimeter of circular portion 29 of closet flange 22. This arrangement is easily installed on existing closet flanges at a small increased risk of leaks occurring between apron 10 and closet flange 22.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed:

1. A leak-indicating apron adapted to be positioned between the base of a toilet and an underlying supporting floor in interactive association with a closet flange that establishes leak-proof joinder between said toilet base and a soil pipe that extends through said floor, said apron comprising:

a) a compliant impervious thin sheet comprised of a film of polymer material having upper and lower surfaces and an outer perimeter which extends beyond the outer edge of said toilet base and having a circular aperture of between 3 and 5 inch diameter configured to snugly embrace said soil pipe or closet flange, said sheet having a thickness between 10 and 80 mils, and b) a colorant emitting disc comprised of a porous substrate having a uniform thickness between 0.01 and 0.2 inch and bounded by inside and outside circular edges which define a width between 0.5 and 2.0 inches, said disc attached by adhesive to said upper surface in surrounding annular relationship about said aperture, the colorant in said disc being released by contact with water.

2. The apron of claim 1 wherein a center axis bisects said perimeter.

3. the apron of claim 2 wherein said aperture is centered upon said axis and centered with respect to said perimeter.

4. The apron of claim 1 wherein said porous substrate is a felt.

5. The apron of claim 1 wherein said porous substrate is a porous sheet.

6. The apron of claim 1 wherein said porous substrate is an open-celled foam.

7. The apron of claim 1 wherein said adhesive does not occlude the pores of said porous substrate.

* * * * *